Oct. 11, 1949.  H. J. GARDNER  2,484,281
VEGETABLE CUTTER

Filed Oct. 28, 1946  2 Sheets-Sheet 1

Inventor
H. J. Gardner
By CA Snow & Co.
Attorneys.

Oct. 11, 1949.　　　H. J. GARDNER　　　2,484,281
VEGETABLE CUTTER
Filed Oct. 28, 1946　　　2 Sheets-Sheet 2
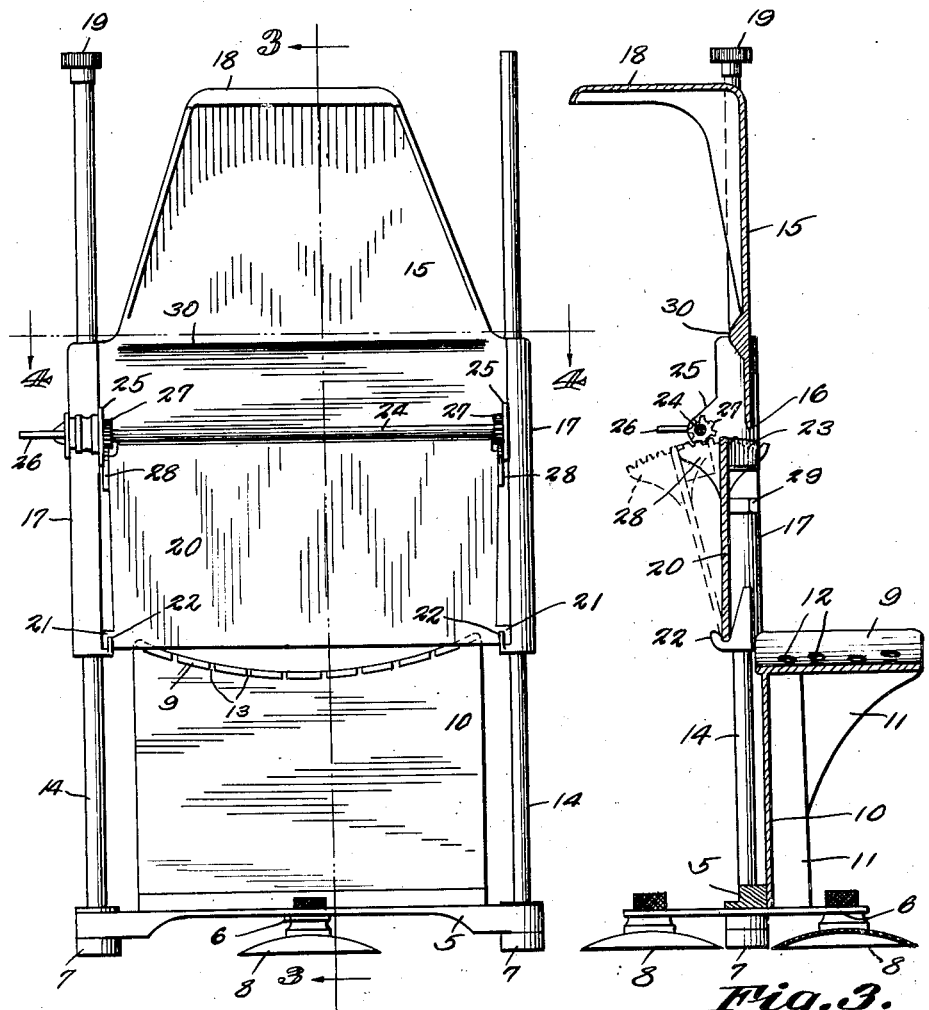
Fig. 2.
Fig. 3.
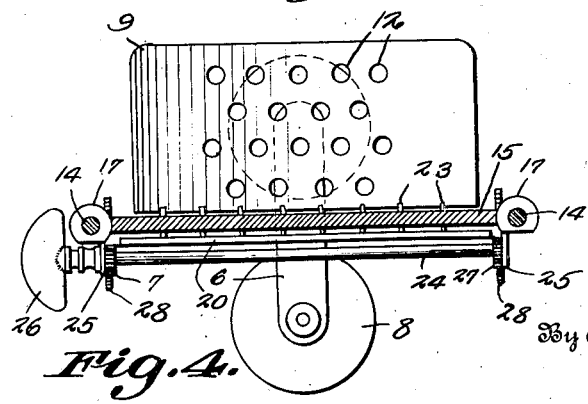
Fig. 4.
H. J. Gardner
Inventor
By C. A. Snow & Co.
Attorneys Patented Oct. 11, 1949

2,484,281

UNITED STATES PATENT OFFICE 2,484,281

VEGETABLE CUTTER

Harry J. Gardner, Traverse City, Mich.

Application October 28, 1946, Serial No. 706,225

2 Claims. (Cl. 146—78)

This invention relates to devices for cutting vegetables or the like, the primary object of the invention being to provide a device of this character which will embody adjustable means, whereby increased versatility is given the device as to the types of vegetables which can be cut thereby, and as to the shapes and thickness of the cut portions.

Another important object of the invention is to provide a device of this character which is suitable for easy manual operation, is simple in construction, having few parts, and which can be readily assembled in order to permit facility in cleaning the device after use.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 2 is a rear elevational view.

Figure 3 is a sectional view taken on line 3—3 of Figure 2.

Figure 4 is a sectional view taken on line 4—4 of Figure 2.

Figure 1:
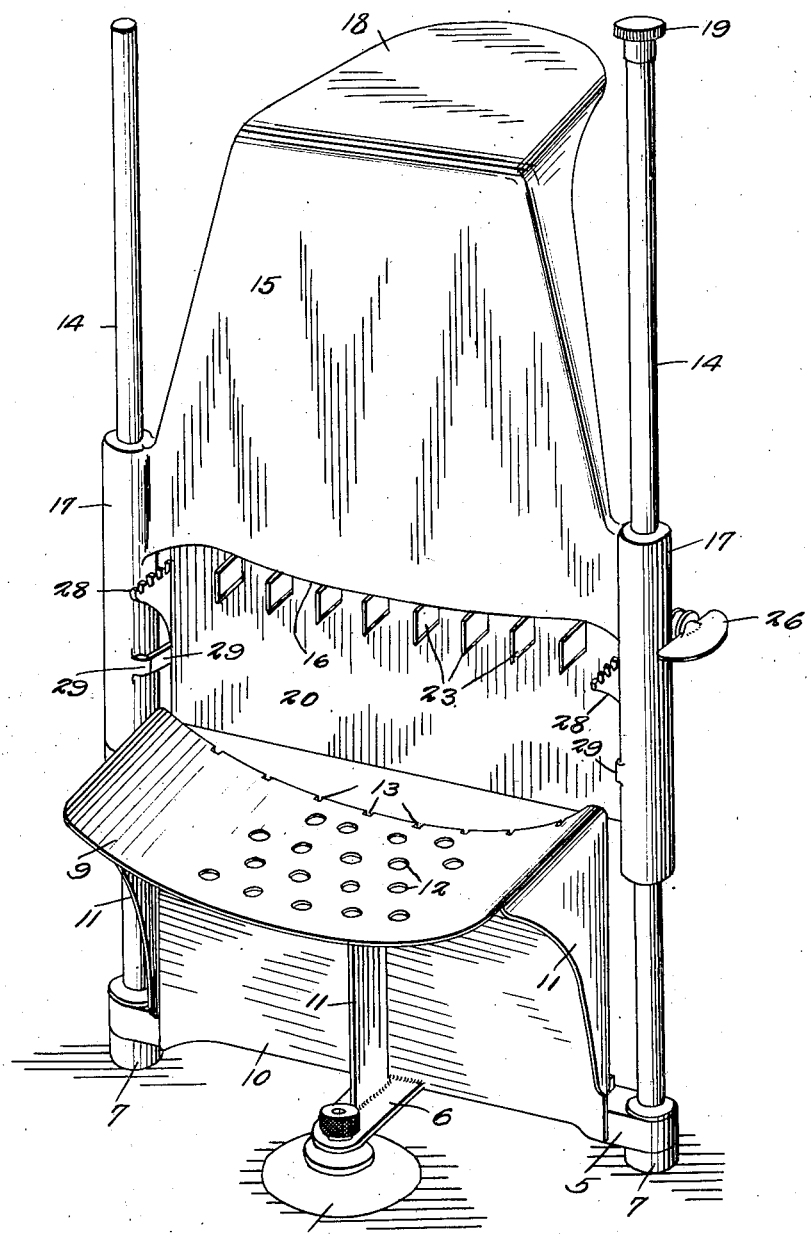
Figure 1 is a perspective view of a vegetable cutter constructed in accordance with the invention.

Referring to the drawing in detail, the invention is basically constructed with a stationary or base portion, which serves as a support or holder for the article being cut, and a movable cutting member mounted on the base portion.

Referring to the stationary or base portion, the invention embodies transversely crossed horizontal base members 5 and 6, which are joined intermediate their ends by welding means or the like. Legs 7, which are preferably formed of rubber material, are secured to the base member 5, and there are secured to the base member 6 suction cups 8, which, togther with the legs 7, form a secure and shock-absorbent base for operation of the device.

Fixedly mounted on the base members 5 and 6 is a vegetable holder 9, which is connected to said base members by means of a vertical plate 10, there being cooperating brackets 11 between the holder, plate, and base members, which serve to keep the holder and vertical plate in fixed position during cutting operations.

The vegetable holder 9 serves as a platform on which vegetables are positioned preparatory to their being cut by the device, and accordingly, the holder is preferably formed with a depressed curved surface, in order to provide a steadier support for the vegetable. There are, in addition, spaced openings 12 disposed in the surface of the holder 9, which contribute to drainage of vegetable juices during the cutting operation. Further, the holder 9 is provided with spaced notches 13 in its leading edge, along which the vegetables are cut, said notches accommodating the outer side edges of spaced knives which are embodied in the invention and which will be discussed hereinafter in detail.

Referring further to the stationary portion of the device, vertical elongated supporting rods 14 are fixedly mounted on the ends of the horizontal base member 5, and serve as a track for the cutting portion of the device, which is mounted between said rods for vertical and slidable movement thereon.

This cutting portion embodies basically two members, one of which is a longitudinal knife member integrally formed with sleeves and a handle, and the other a member pivoted to the first member and carrying a set of knives arranged in transverse cooperating relation to the longitudinal knife member.

The longitudinal knife member embodies a body portion 15 which has its lower edge formed as a knife 16 longitudinally disposed between the vertical supporting rods 14. In addition, the body portion 15 is integrally formed at the lower ends of its sides with long sleeves 17 which are slidably mounted on the rod 14, and which extend downwardly below the lower edge of the body portion 15 for a considerable distance. From the upper ends of the sleeves 17, the sides of the body portion 15 are tapered, the top and sides of the body portion being formed integrally into a handle 18 which is adapted either to be grasped in moving the cutting portion of the device upwardly, or to serve as a support for the heel of the palm in moving the cutting member downwardly.

One of the vertical supporting rods 14 is provided at its upper end with exterior threading, for receiving a cap nut 19, which serves as a stop preventing the cutting portion of the device from being dismounted from the rod 14 during operation of the device, said cap nut providing in addition means for dismounting the cutting portion from the rods 14, when it is desired to disassemble the device for cleaning purposes or the like.

Pivotally mounted to the sleeve 17 is a vertical plate 20 having trunnions 21 extending from its sides at its lower edge, said trunnions being removably positioned within ears 22 projecting from the sleeve 17, at the lower ends of the sleeve.

Mounted on the plate 20 along its upper edge are small knives 23 which are disposed at right angles to the plate, having their lower edges formed as their cutting edges, and which are arranged in spaced relation to each other.

As previously mentioned, and as can be clearly seen by reference to Figure 3 of the drawings, the knives 23 are disposed transversely to the knife 16, and their outwardly extended side edges project beyond the cutting edge of the knife 16, when the plate 20 is in vertical position, as shown by the full lines in Figure 3.

Means are embodied in the invention for adjustment of the knives 23 in relation to the knife 16. A shaft 24 is revolvably mounted in bearing openings formed in ears 25 rearwardly projecting from the sleeves 17 near the upper ends of the sleeves, the shaft 24 being provided with a winged head 26, so as to permit easy manipulation of the adjusting means, and with pinions 27, which are mounted on the shaft interiorly of the bearing openings and which are positioned against the bearing openings so as to prevent horizontal movement of the shaft. Meshing with the pinions 27 are curved racks 28, which are mounted on the side edges of the plate 20, adjacent the upper edge of the plate 20, providing means for pivotal movement of the plate 20 in the manner shown by the dotted line in Figure 3 of the drawing.

In addition, cooperating stop projections 29 are formed on the sleeve 17 and the plate 20, whereby the plate 20 is prevented from pivoting in a forward direction beyond its vertical position.

When the plate 20 is in vertical position, it is in parallel spaced relation to the longitudinally disposed knife 16. Thus, the plate 20, when raised, serves as a stop or guide against which the vegetable being cut may be positioned prior to the user moving the knives downwardly for the purpose of cutting the vegetable as desired. When the device is adjusted to this position, it is adapted for cutting a peeled potato into shape to permit French frying, since the knife 16 fulfills the purpose of cutting the potato into slices, and the transversely disposed knives 23 concurrently cut the slices into longitudinal sections. It is pointed out, in this connection, that as the knives descend, the cut portions of the vegetable are forced rearwardly and away from the device by reason of an enlarged portion 30 horizontally extending across the rear face of the body portion 15 above the knife 16 and in parallel relation to the knife 16.

When the plate 20 is adjusted to the position shown by the dotted lines of Figure 3, or removed from the device entirely, it is additionally possible to operate the device as a slicer, for potatoes, carrots, or the like, or to use it to cut vegetables or fruit into large segments if desired. Further, it is adapted for shredding such vegetables as cabbage, or lettuce, by adjusting the plate 20 to a vertical position, or if desired, by adjusting it to a position such as is indicated by the dotted lines of Figure 3.

Also, vegetables can be cut by the device and returned for further cutting, permitting dicing or chopping of the vegetables by easy means.

The description of the invention which has been provided herein, and the drawings annexed, have been confined to showing the invention in a position for vertical operation of the cutting portion thereof. However, it is pointed out that the invention is also adapted to be positioned for horizontal operation of said cutting portion, as the means embodied in the base for securing the device to a flat surface would apply to a smooth vertical surface as well, and the device could accordingly be positioned against such vertical surface, thereby permitting the cut vegetables to drop into a container positioned below the device.

What is claimed is:

1. A device for cutting vegetables or the like, embodying a base, means for securing the base to a supporting surface, a vegetable holder fixedly mounted on the base, and having a depressed curved surface formed with openings disposed in the surface, spaced rods vertically and fixedly mounted on the base, a cutting member slidably mounted on said rods, said cutting member having a knife integrally formed therein and being longitudinally disposed between the rods, a handle, and sleeves whereby the cutting member is slidably mounted on said rods, a longitudinally disposed enlargement rearwardly projecting from said cutting member adjacent to and above the knife of the cutting member, a cutting member pivotally mounted on the sleeves, having spaced knives transversely disposed to the aforesaid longitudinally disposed knife, means for pivotally adjusting the latter cutting member in relation to the first cutting member, said adjusting means comprising a shaft, ears rearwardly projecting from the sleeves, said ears being provided with horizontally aligned bearing openings, the shaft being revolvably mounted in the openings, a winged nut on the shaft, pinions on the shaft, and cooperating racks on the latter cutting member, cooperating stop projections on the sleeves and latter cutting member, and means for dismounting of the said cutting members from the device and from each other.

2. A device for cutting vegetables or the like, embodying a base, means for securing the base to a supporting surface, a vegetable holder fixedly mounted on the base, having a depressed curved surface and having openings disposed in the surface, spaced rods vertically and fixedly mounted on the base, a cutting member slidably mounted on said rods, said cutting member having a knife integrally formed therein, said knife being disposed longitudinally between the rods, a handle formed on the cutting member, sleeves formed on the ends of the cutting member, whereby the cutting member is slidably mounted on said rods, a longitudinally disposed enlargement projecting rearwardly from said cutting member adjacent to and above the knife formed in the cutting member, a cutting member pivotally mounted on the sleeves, embodying spaced knives transversely disposed to the aforesaid longitudinally disposed knife, means for adjusting the latter cutting member to various positions rearwardly of the first cutting member, said adjusting means comprising pinion means mounted on the sleeves and cooperating rack means mounted on the latter cutting member, cooperating stop projections preventing forward pivotal movement of the latter cutting member beyond a vertical position, and means for dismounting of the said cutting members from the device and from each other.

HARRY J. GARDNER.

REFERENCES CITED

The following references are of record in the file of this patent:

UNITED STATES PATENTS

| Number | Name | Date |
|---|---|---|
| 36,194 | Peck | Aug. 12, 1862 |
| 537,831 | Kraemer | Apr. 23, 1895 |
| 710,085 | Stevens | Sept. 30, 1902 |
| 838,357 | Rookus | Dec. 11, 1906 |
| 940,252 | Johnson | Nov. 16, 1909 |
| 1,397,469 | Vaughn | Nov. 15, 1921 |
| 1,932,173 | Fouke | Oct. 24, 1933 |